United States Patent
Buchheit (10) Patent No.: US 9,215,202 B1
(45) Date of Patent: *Dec. 15, 2015

(54) ONLINE FORM COMPLETION AND SAVING TRIGGERED BY RECEIPT OF AN EMAIL MESSAGE AT A FINAL EMAIL SERVER

(71) Applicant: Brian K. Buchheit, Davie, FL (US)

(72) Inventor: Brian K. Buchheit, Davie, FL (US)

(*) Notice: Subject to any disclaimer, the term of this patent is extended or adjusted under 35 U.S.C. 154(b) by 0 days.

This patent is subject to a terminal disclaimer.

(21) Appl. No.: 14/558,047

(22) Filed: Dec. 2, 2014

Related U.S. Application Data (63) Continuation of application No. 13/345,812, filed on Jan. 9, 2012, now Pat. No. 8,914,450.

(51) Int. Cl.
G06F 15/16 (2006.01)
H04L 12/58 (2006.01)
H04L 29/08 (2006.01)
G06Q 10/10 (2012.01)
G06F 17/30 (2006.01)

(52) U.S. Cl.
CPC .......... H04L 51/28 (2013.01); G06F 17/30386 (2013.01); G06Q 10/10 (2013.01); H04L 51/08 (2013.01); H04L 67/06 (2013.01)

(58) Field of Classification Search
CPC ......... H04L 51/28; H04L 51/08; H04L 67/06; G06Q 10/10; G06F 17/30386
USPC ...................... 709/206, 203; 707/784; 726/28
See application file for complete search history.

(56) References Cited

U.S. PATENT DOCUMENTS

| | | | | |
|---|---|---|---|---|
| 7,555,526 | B1 * | 6/2009 | Heidloff et al. | 709/206 |
| 8,615,554 | B1 * | 12/2013 | King et al. | 709/206 |
| 2002/0042815 | A1 * | 4/2002 | Salzfass et al. | 709/206 |
| 2002/0174185 | A1 * | 11/2002 | Rawat et al. | 709/206 |
| 2003/0200272 | A1 * | 10/2003 | Campise et al. | 709/206 |
| 2003/0233353 | A1 * | 12/2003 | Taylor | 707/3 |
| 2004/0006597 | A1 * | 1/2004 | Hughes | 709/206 |
| 2005/0216567 | A1 * | 9/2005 | Ruiz | 709/206 |
| 2010/0056109 | A1 * | 3/2010 | Wilson et al. | 455/412.1 |
| 2010/0223234 | A1 * | 9/2010 | Gaucas et al. | 707/687 |
| 2011/0154464 | A1 * | 6/2011 | Agarwal et al. | 726/8 |
| 2011/0246212 | A1 * | 10/2011 | Barnes | 705/1.1 |
| 2012/0143972 | A1 * | 6/2012 | Malik et al. | 709/206 |

* cited by examiner

Primary Examiner — Joon H Hwang
Assistant Examiner — Abdulkader M Alriyashi
(74) Attorney, Agent, or Firm — Patents on Demand P.A.; Brian K. Buchheit; Scott M. Garrett (57) ABSTRACT

Responsive to receiving an email message, a final email server triggers execution of a form completion action. Execution of the action determines a user id within a non-email system that is associated with a user identifier having an email address specified within the email message. The user identifier and a password associated with the user identifier are used to log onto the non-email system. At least a portion of one of the fillable forms of the non-email system is completed using content of a body of the email message, content of an attachment of the email message, or combinations thereof. The completing of one of the fillable online forms results in a generated document that was not a document included in the email message. The generated document is stored in a file system on behalf of a user identified by the user identifier.

20 Claims, 5 Drawing Sheets

Local Part 210 (110)                               Docket Management System 220

Value Docket #123                     Docket 123 → associated with Folder A
                                              222                              224

Table 240

| Useraddress 242 | User.ID 244 | Permit Write? 246 |
|---|---|---|
| Joe123@work.com | Joe.Smith | If email from IP/MAC on record |
| ... | ... | ... |

| Fractional Email domain "law.com" 405 |
| --- |

| Local part 410 | | Domain 415 | |
| --- | --- | --- | --- |
| Brian | @ | law.com | Brian Smith |
| Brian | @ | law.com | Brian Jones |
| Brian | @ | law.com | Brian Buchheit |
| Brian | @ | law.com | Brian Miller |

From Contact list A (Brian Smith) 420

| Anne | |
| --- | --- |
| Sue | |
| Tom | |
| Jim | |

From Contact list B (Brian Jones) 425

| Jane | |
| --- | --- |
| Fred | |
| Robert | |
| Jim | |

ONLINE FORM COMPLETION AND SAVING TRIGGERED BY RECEIPT OF AN EMAIL MESSAGE AT A FINAL EMAIL SERVER

CROSS REFERENCE TO RELATED APPLICATIONS

Pursuant to 35 USC §120, this non-provisional application claims priority to and benefit of U.S. application Ser. No. 13/345,812 soon to be issued as U.S. Pat. No. 8,914,450, which was filed on Jan. 9, 2012, which claims priority to provisional U.S. Patent Application Ser. No. 61/430,740 filed on Jan. 7, 2011. The entire contents of U.S. application Ser. No. 13/345,812 and 61/430,740 are incorporated by reference herein in their entirety.

BACKGROUND

The present invention relates to the field of email communications, and more specifically, to online form completion and saving triggered by receipt of an email message at a final email server.

Email is a very popular mechanism for sending/receiving content. Some of the advantages for email over other communications mechanisms include its simplicity, its ease of use, and its ability to be handled in batch. Email permits a user to establish a message, hit send, and take no further action, unless desired.

This is a very different paradigm from what is typically used for online form completion actions. Completion of an online form generally requires an end-user to log onto a specific Web site via a computer running a browser. Use the browser to present an online form, which is manually completed using user input. Problems of interrupted communication connections or an end-user device powering off or otherwise experiencing a problem during completion of the online form, typically requires the entire process of online form completion to be reinitiated.

It would be beneficial to end-users to be able to complete and save online forms with a convenience of an email message, which is not currently possible or contemplated outside the instant disclosure.

DETAILED DESCRIPTION

One aspect of the disclosure can include taking one or more automated or semi-automated actions upon receipt of an email message. The received email message can be "successfully received" by an email server (and can be indicated as such to the sender), even though the email message was never delivered to an actual destination mail box. Instead, a set of actions (for example, placement of email attachments in a specific folder of a docket management system) can occur. In one embodiment, external data in combination with the email specific data can be utilized in one or more actions taking place resulting from the receipt of an email message. Such an action that can involve external as well as email specific data can be auto filling of an online form (for example, an online filing form at the United States Patent and Trademark Office) responsive to receiving an email message. External data can be, for example, user credentials for logging into a system where the one or more actions are to be performed.

To elaborate, a user can address an email message to an email server, which triggers online form completion on behalf of that user. The online form completion can be handled by a non-email system, such as a network system providing fillable online forms to users. Instead of having to complete the fillable form using a Web browser (where a form is presented and manually completed), the form is completed, at least in part, automatically (without an end user needing to manually interact with the non-email system). A user id associated with the non-email system can be determined from the sender's email address, which is typically unique to a user within an email system. A stored password or security key/token can be previously stored as relating to the user id. This user identifier and password can be used to log onto the non-email system. At least a portion of one of the fillable online forms is completed using content of a body of the email message, content of an attachment of the email message, or a combination thereof. The completing of one of the fillable forms results in a generated document that was not a document included in the email message. The generated document is then stored in a file system on behalf of a user identified by the user identifier. The file system is located remotely from the final email system. The completing of the fillable online form and the storing of the generated document occurs automatically without manual user interactions with the non-email system and occurs responsive to receiving the email message at the final email server.

For example, the United States Patent and Trademark Office includes an online system through which patents are able to be filed. A number of online forms are completed as part of this process, which are uploaded to the USPTO's file system. An embodiment of the disclosure would permit an end user to convey an email message that includes the necessary information needed to complete the USPTO's forms within a body and/or attachment of an email message. This message can be conveyed via normal email channels to ultimately arrive at a final email server. The final email server can trigger a completion and saving of a USPTO form on behalf of the sender of the email message without the sender of the email message having to manually interact with the USPTO Web site. Some additional information (not included in the email message) may be used to complete the form and/or to provide additional information to the USPTO web site (such as uploading a patent application, providing petitions for extension of time, and the like). The end-user certificate needed for accessing private pair (the USPTO Web site) can be the considered the user identifier that is associated with and that is determined from the sender's email address. Other use cases are contemplated, such that online forms are automatically completed using content contained in the email message (and in contemplated embodiments using other external content not contained in the email message). The above embodiment for filling out online forms responsive to sending an email message can be incorporated with other innovations detailed herein.

According to embodiments of the disclosure, at present, sending an email message to an address ensures that a corresponding recipient receives the message. That is, email addresses are considered globally unique communication endpoints, which are typically associated with an individual, corporation, or work role. Requiring each user and/or entity to have a unique email address quickly consumes "good" addresses. Many people have semi-obscure email addresses that are difficult to remember. This is especially true for "premium names" that are popular. For example, gmail.com is a domain that has become a very popular email source, so that desired names (e.g., the local part of the email address) are often taken by others. The situation has risen to a point that 'good' email manes have become valuable commodities, which are sold for significant amounts.

The situation roughly corresponds to vanity 1-800 numbers and directly corresponds to premium domain names. Unlike 1-800 numbers (which permit a person to purchase a fractional 800 number), no equivalent is known to exist for email addresses.

Embodiments of the disclosure provides a solution allows for a number of advantageous interactions with email: users can, with the disclosure provided systems, methods and computer program products, overload email addresses. That is, multiple people can have the "same" email address, and routing rules can be established for determine who is to receive a specific message from a specific recipient. In other words, with the disclosed overloading of email addresses, one or more automated or semi-automated actions can be taken based upon receipt of an email message, wherein the one or more actions can include external data as well as email specific data; fractional email addresses can be generated and utilized; and email messages with improper destination emails can be sent and routed correctly.

Embodiments of the present disclosure can include a system, method, or computer program product that includes a computer readable storage medium having embedded computer usable program code, wherein the computer usable program code can be configured for overloading email addresses, which can allow a number of advantageous interactions with email. These advantageous interactions with email can include the overloading of email addresses (use of the same address by multiple sets of people where routing of messages among this set of people is determined by configurable routing criteria), and redirection of messages sent to an email address to a remotely located file system Another aspect of the disclosure can include fractional email addresses. Fractional email addresses or email addresses can allow multiple users to purchase and use a single domain for an email address while at the same time purchasing and utilizing the same local part of the email address as another user associated with the same domain. Thus, the final server (a server that is associated with mail exchanger records) will have to resolve a conflict in order to properly route an email message sent to an email address that has multiple owners of the same local and domain part of the email message.

Yet another aspect of the disclosure can include a method, system, or computer program product that can be configured to properly route an email message that is lacking a proper destination address. In one embodiment, this aspect can be implemented in a server side manner fully compliant with email standards. In this embodiment, a number of easy to remember domain names can be used, where each of these domains has a mail exchanger (MX) record within a domain name system (DNS), which points to a server, which can in turn determine a proper address. Then the email message can be re-routed (or forwarded) to that determined address.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

System for Overloading Email Addresses

Figure 1:
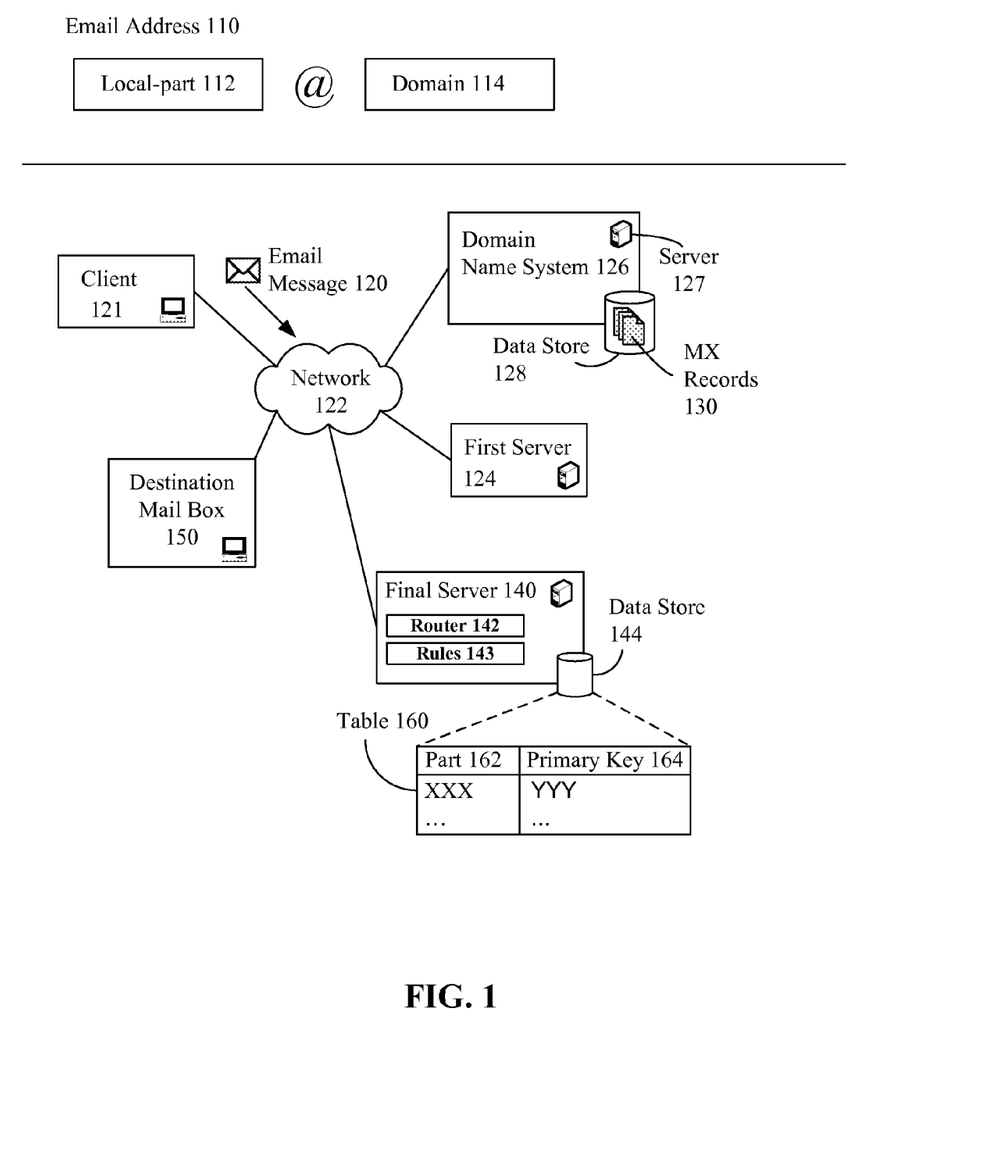
FIG. 1 shows the composition of an email address and a system for routing email messages designated to be sent to overloaded email addresses in accordance with embodiments of the inventive arrangements disclosed herein.

FIG. 1 shows the composition of an email address and a system 100 for routing email messages designated to be sent to overloaded email addresses in accordance with embodiments of the inventive arrangements disclosed herein. The format of email addresses is formally defined in RFC 5322 (mostly section 3.4.1) and by RFC 5321. An email address is a string of a subset of ASCII characters (see however the internationalized addresses below) separated into two parts by an "@" (at sign), a "local-part" and a domain, that is, local-part@domain. Definitions of RFC 5322 and 5321 are not to be construed as limiting the disclosure and concepts detailed and claim herein can interoperate with adaptations of these standards and alternative definitions for email addresses.

In one part, FIG. 1 shows the email address 110, the local part 112, and the domain 114 separated by the "@" symbol. The local-part 112 of the email address 110 may use any of these ASCII characters:

Uppercase and lowercase English letters (a-z, A-Z)
Digits 0 to 9
Characters ! # $ % & ' * + − / =? A ˆ _ ' {|} ~
Character . (dot, period, full stop) provided that it is not the first or last character, and provided also that it does not appear two or more times consecutively (e.g., John..Doe@example.com is not an acceptable email address).
Additionally, quoted-strings (e.g., "John Doe" @example.com) are permitted, thus permitting characters otherwise prohibited. However, this form is not commonly used. RFC 5321 also warns that "a host that expects to receive mail should avoid defining mailboxes where the Local-part requires (or uses) the Quoted-string form" (sic).

The domain 114 of the email address 110 is an identification label that can define a realm of administrative autonomy, authority, or control in the Internet. Domains 114, also referred to as domain names, are also hostnames that identify Internet Protocol (IP) resources such as web sites. Domains 114 are formed by the rules and procedures of the Domain Name System (DNS).

Transport of email message 120 across the Internet (or other network 122) can use the Simple Mail Transfer Protocol (SMTP), which is defined in Internet standards RFC 5321 and RFC 5322, while mailboxes are most often accessed with the Post Office Protocol (POP) and the Internet Message Access Protocol (IMAP).

Upon receipt of the email message 120 from a client 121, an email server 124 (e.g., an SMTP server) looks up the domain name using the Domain Name System (DNS) 126, which can comprise a distributed database (data store 128 can be part of this database). DNS 126 can include a set of servers 127 as well. The server 124 can query the DNS 126 for any mail exchanger records (MX records) 130 to find the host name of a designated mail transfer agent (MTA) for that address (e.g., the address 110 included in email message 120). That way, the organization holding the delegation for a given domain (114)—the mailbox provider—can define which are the target hosts for all email destined to its domain. The mail exchanger does not need to be located in the domain of the destination mail box, it must simply accept mail for the domain.

The target hosts (that include final server 140) are configured with a mechanism to deliver mail to all destination mail boxes 150. The local-part 112 of an address 110, is defined to be opaque to intermediate mail relay systems (e.g., all servers 124 between the first server 124 and the final server 140) except the final mailbox host (e.g., server 140).

According to RFC 5321 2.3.11 Mailbox and Address, "the local-part 112 must be interpreted and assigned semantics only by the host specified in the domain 114 part of the address 114". This means that no assumptions can be made about the meaning of the local-part 112 of another mail server (server 124 and/or any intermediate servers). It is entirely up to the configuration of the final mail server 140. Thus, the local-part 112 of the address 110 is effectively ignored by email servers (other than the final server 140, which is indicated by the MX records 130) that are compliant with RFC 5321.

Hence, interpretation of the local-part 112 of an email address 110 is dependent on the conventions and policies implemented in the specific mail server (e.g., final server 140). For example, case-sensitivity may distinguish mailboxes differing only in capitalization of characters of the local-part, although this is not very common. For example, GMail™ (Google™ Mail) ignores all dots in the local-part for the purposes of determining account identity. This prevents the creation of user accounts of "your.user.name" or "yourusername" when the account "your.username" already exists.

In one embodiment, key enhancements to a router 142 of the final email server 140 can result in the email messages 120 being directed to different mail boxes 150 than conventionally possible. That is, conventionally, a single mailbox 150 is associated with a local part 112. Thus, server 140 uses that data store 144 to look-up one-to-one correspondences between a local part 112 of a message and a destination mail box 150.

Some file email servers 140 permit the establishment of a "catch-all" destination box 150. When an address lacking a matching local-part 112 is received by the final server 140, it is routed to the catch-all box 150, which can be an administrative account, which ensures that email with misspellings are not "bounced" or rejected by the final email server 140, but are instead delivered to someone who can manually route this message (e.g., forward it) to the proper recipient, if any.

In the disclosed embodiment, dynamic "local part" names can be used, which do not map to a specific destination mail box 150 and that are not a catch-all. Instead, the local part 112 can be mapped (part 162) to a unique value via a table 160, which has a specific semantic meaning. The unique value (part with the primary key or a pseudo key) is referred to herein as primary key 164, but it should be noted that it need not be a true unique key in all embodiments in accordance with the disclosure. That is, some level of inference may be required. However, for simplicity of expression during this disclosure, the situation where a unique key 164 exists shall be focused upon.

It should be emphasized that since the local-part 112 is handled by the final server 140 (and ignored by the domain name system 126, first server 124, and any intermediate servers) changes for embodiments of the disclosure require only changes to the final server 140. Standard infrastructure components that are unmodified from the standards for email (e.g., RFC 5321 and/or 5322, for example) can be used in cooperation with the disclosure's details to achieve an email delivery system with a dynamic local-part 112 not statically linked to a specific target.

Leveraging the dynamic local-part 112, which is handled in accordance with rules 143 of the final server 143 results in numerous advantages over known solutions. For example, in one embodiment, a single email address (having the same local-part 112 and the same domain 114) can be conveyed to a different set of destination mail boxes 150 depending on dynamic or variable conditions. For example, fractional email addresses can be sold (where a person pays for an email address 110 that is good for only certain conditions). For example, one person can "own" or "lease" an email address 110 for traffic originating from Texas, another person for traffic originating from Florida, and the like. In another example, a set of people can "own" a common email address 110, where routing is determined based on the potential recipient's contact list. So if an email is from "john smith" and only one person who shares the email address 110 has "john smith" in his contact list, then that person will receive the message. The routing of the email address 110 in each of these instances can be dependent upon rules 143 established for router 142.

In another embodiment, a set of one or more actions can be taken upon receipt of the email message. For example, attachments can be received by a docketing system and handled in a specific manner, responsive to receiving an email message.

In yet another embodiment, the destination email address can trigger a set of actions, which cause information to be added to what was sent in the email address based on information known from the email address, and to complete an automated task in response to the sending or receiving of the email message.

As used herein, network 122 can include any hardware/software/and firmware necessary to convey data encoded within carrier waves. Data can be contained within analog or digital signals and conveyed though data or voice channels. Network 122 can include local components and data pathways necessary for communications to be exchanged among computing device components and between integrated device components and peripheral devices. Network 122 can also include network equipment, such as routers, data lines, hubs, and intermediary servers which together form a data network, such as the Internet. Network 122 can also include circuit-based communication components and mobile communication components, such as telephony switches, modems, cellular communication towers, and the like. Network 122 can include line based and/or wireless communication pathways.

As used herein, presented data store 128, 144 can be a physical or virtual storage space configured to store digital information. Data store 128, 144 can be physically implemented within any type of hardware including, but not limited to, a magnetic disk, an optical disk, a semiconductor memory, a digitally encoded plastic memory, a holographic memory, or any other recording medium. Data store 128, 144 can be stand-alone storage units as well as a storage unit formed from a plurality of physical devices. Additionally, information can be stored within data store 128, 144 in a variety of manners. For example, information can be stored within a database structure or can be stored within one or more files of a file storage system, where each file may or may not be indexed for information searching purposes. Further, data store 128, 144 can utilize one or more encryption mechanisms to protect stored information from unauthorized access.

To further elaborate, the email address in embodiments of the disclosure can be considered a dynamic target. A dynamic target can be one that must be determined at a time of processing an email message using variable conditions of the email message that vary from message-to-message. That is, no static mapping exists (that can be determined before variable conditions are assessed) between the email address of a dynamic target and a static recipient. The static recipient can refer to an email inbox of a used, to a forwarding email address, or to a static storage space. In one embodiment, a dynamic target can be one that is not statically mapped to an email recipient's inbox (as are most email addresses), to a forwarding email address (as are some email addresses), to a "catch all" email address (e.g., the email address to which messages of a domain lacking a matching local-part are sent by default; note: this catch all address is still considered a static email address or static recipient for purposes detailed herein), to a junk email holding storage space (e.g., some systems filter email messages for junk mail before conveying them to an intended recipient, the junk mail is considered a static email recipient for purposes detailed herein; in context of junk mail filtering—a static user address is associated with the email address before the assessing, which is explicitly disallowed in embodiments of the disclosure), or combinations thereof.

Performing One or More Actions Upon Receipt of Email Messages

Figure 2:
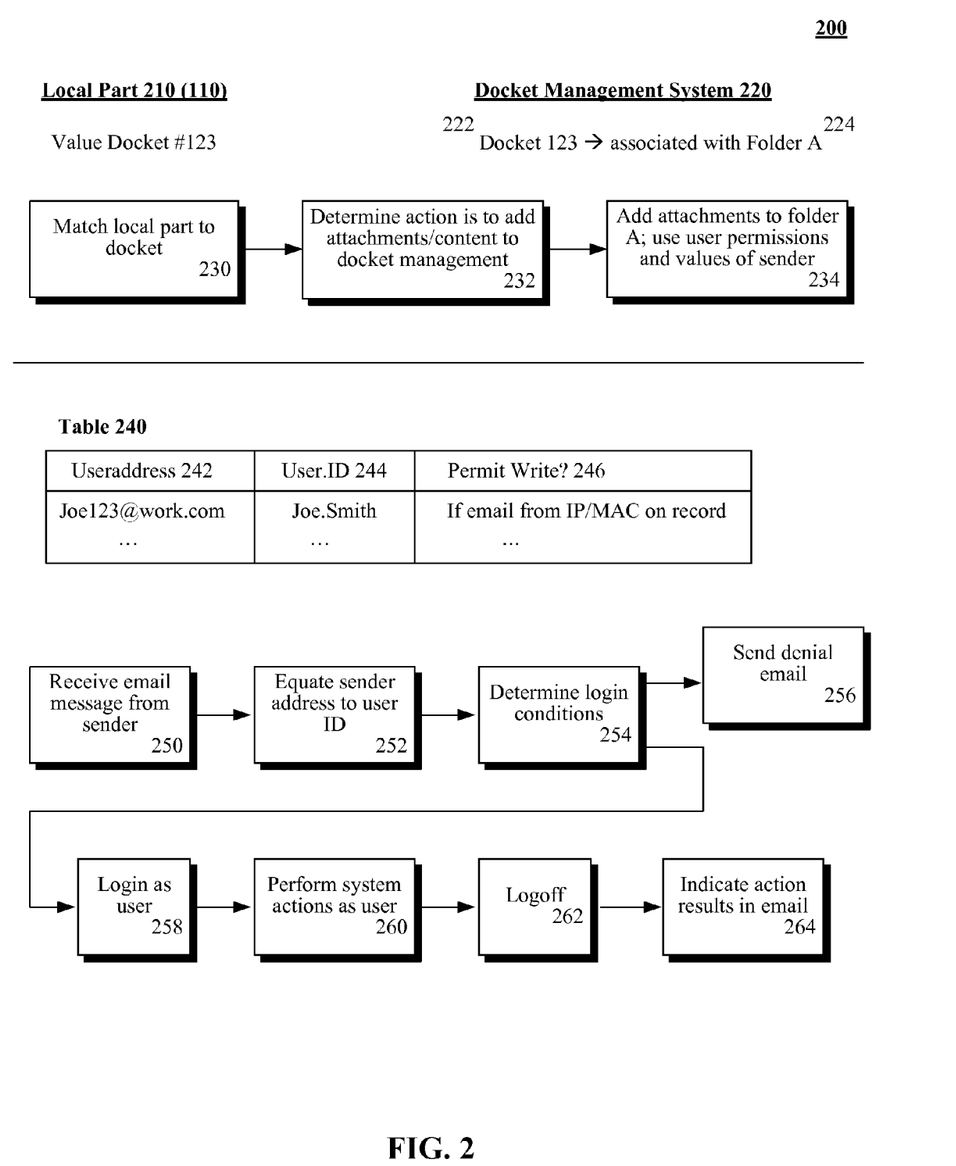
FIG. 2 illustrates an example and flowchart of a method for performing actions upon receipt of an email message in accordance with embodiments of the inventive arrangements disclosed herein.

FIG. 2 illustrates an example and flowchart of a method for performing actions upon receipt of an email message in accordance with embodiments of the inventive arrangements disclosed herein. To illustrate by example the concept of a local part 112 that has a specific semantic meaning, the local part 110 of an email address can include a value 210 of Docket123. The table 160 can match this value to a unique field of a docket management system 220. Docket 123 of the document management system 220 can have a record 222 associated with a specific storage region—folder A 224. The router 142 of server 140 can utilize a set of configurable rules 143 to:

Step 230: match the local part to the docket (Docket 123);
Step 232: to determine that an action to be taken upon receipt of the email message is to add attachments/content to the docket management system 232;
Step 234 to add the attachments to Folder A, which utilizes user permissions and values of the sender.

A number of unique characteristics should be emphasized from this example. The first is that the received email message was "successfully received" by the email server 140 (and indicated as such to the sender), even though the email message was never delivered to an actual destination mail box 150. Instead, a set of actions (in this case placement of the attachments in a specific folder of a docket management system 220) can occur. This is not a requirement of all embodiments, as it is contemplated that delivery to a temporary mail box 150 could occur before the attachments were filed in the document management system, or that a "docket management system" mailbox 150 can be established that can record content of the original message, and that can be linked to the docket management system actions.

It should be emphasized, however, that no known email system indicates that email messages are successfully delivered without placing them in a target mail box, which is possible in one embodiment of the invention—as the actions are substitutions for successfully delivery of the email message. It should be noted that by RFC 5321 standards, the final email server 140 identified by the MX records 130 has significant leeway in actions taken to handle the received email message. Thus, compliance (or effective compliance meaning 100 percent compatibility with existing compliant systems) can be achieved—even if the final server 140 indicates successful delivery without actual delivery occurring to a destination mailbox 150 in one embodiment of the invention.

Another unique characteristics of the disclosure depicted in FIG. 2 (not present in a traditional email scenario) is that important fields of the document management system can be filled in based on the sender of the email message. An email address of the sender can be determined from the "from" portion of the message header of the email message 120 or can be determined using the message envelope. Appreciably, the address of the envelope and header may be equal—forged email addresses often change the message header without being able to change the message envelope—thus use of the message envelope (or confirming the header and message envelop are equal) can be a security precaution.

Regardless, the sender address (per one of the configurable rules 143) is able to be used to determine an identity of a sender. This identity can be stored in the document management system 220 as one of the valid users. An auto login feature (due to the message coming from a known and related email system) can be implemented.

Table 240 shows this situation, where a user's email address 242 is associated with a user ID 244 of a non-email system (in this instance, the document management system). Permissions of what actions are possible can be configured in attribute 246 of table 240. For example, the system may permit an "auto login" of joe_smith for adding any folders on projects that Joe Smith is already identified with. In another example, additions (e.g., from attachments) can be only permitted if the mapped address (or IP address) of the sending device (client 121) is on record by the document management system 220 (or some external validation/authorization server). For instance, the user ID may lack permissions in the document management system to perform the requested actions (determined from the email message).

Using a flow diagram to illustrate the method for taking action based on an email message in this instance, the email message from the sender can be received in step 250. In step 252, the sender's address can be equated to a user ID of a system (other than the email server system). In one embodiment, a "common login" can be used for the email server and the system for which actions are being taken, which negates the need to use a separate ID. Login conditions and their satisfaction or not can be determined in step 254. Any set of conditions can be established for security—such as time of day restrictions, sending device (client 121) restrictions, project specific conditions (e.g., user is on a project for which he/she is adding content), and the like. If the login conditions are not satisfied, an email message can be sent to the sender of the email message 120, as shown by step 256. Additionally, in one embodiment, a security expert can be flagged that access was attempted/denied and/or a log of the attempt along with email information (the email envelope) can be saved/logged for security purposes.

If access is permitted from step 254, the system (not the email system) can login the user automatically, as shown by step 258. System designated actions (per rules 143, for example) can be taken, where these actions are taken by the user. Thus, any added/modified files or records can be associated with the user ID that corresponds to the sender of the email message. The above can be used for any computing application.

It should be appreciated that any set of rules 143 can be established for handling incoming email. A simple rule can be to file attachments as documents associated with a specific product, folder, or project. In one embodiment, the documents can be sent to a user's "mydocuments" or "download" folder by default. Version management (versioning) and/or automatic replacement of older files can be implemented in one contemplated embodiment. Rules 143 and user (e.g., sender) specific profiles can be established to indicate which storage location is to be used by default.

Rules 143 and related actions are not limited to email attachments. In another embodiment, the rules 143 can parse content of the subject and/or body of the email message to determine what action(s) to trigger within an external (to an email application/system) responsive to receiving the message. In one embodiment, the subject can include a "command" that is to be carried out by the application. In another embodiment, a command can be appended to the local-part 112 of the address 110. For example, address tagging (e.g., docket123+save@example.com) can be used to indicate a command to perform after the "+" sign. Since some email servers violate RFC 5322, and the recommendations in RFC 3696, by refusing to send mail addressed to a user when a "+" character is used, different conventions for the local-part 112 can be established (such as using docket123_save@example.com).

The above is one of many contemplated actions. Other actions can include "cal1210128am" which can schedule an appointment with a calendaring program on Dec. 10, 2012 at 8 am—details of the scheduling can be specified in the email body. Alternatively, the "cal" command (i.e., bb+cal@office.com) can indicate a user desire to schedule a conference (for a user associated with the bb@office.com email address, where the scheduling details (including time, location) are included in the email body. Another action (pwroff) can determine be used to turn off a computer or other electronic device capable of receiving an email message or linked to a system that is able to receive an email message. Hence, bb+pwroff_mymachine1@office.com can cause a computer identified as "mymachine1" to be powered off—assuming that the user associated with bb@office.com has permission to power-off that machine. In another example, a phone number can be maintained in a contact list of a remote email system, such as "joe doe" being in BB's stored contacts. A command of bb+getphone_joedoe@office.com can cause the receiving system (final server of bb@office.com) to lookup joe doe's phone number from a user associated with bb@office.com and to send an email response to the sending address of the email.

It should be appreciated that the actions performed per the rules 143 can utilize data when performing these actions, where the data is contained in a system independent of (and possibly not accessible by) the email server 140. For example, the user ID and password used to log-in the docket management system 220 is needed data not accessible by server 140. Other types of data can also be used. For example, project specific data (managed by a project management server) can be looked up for a given user that corresponds to the sender's email address, where the process specific data is used as a parameter needed by one or more actions executed responsive to receipt of the email message.

Utilizing External Data with Email Data

Figure 3:
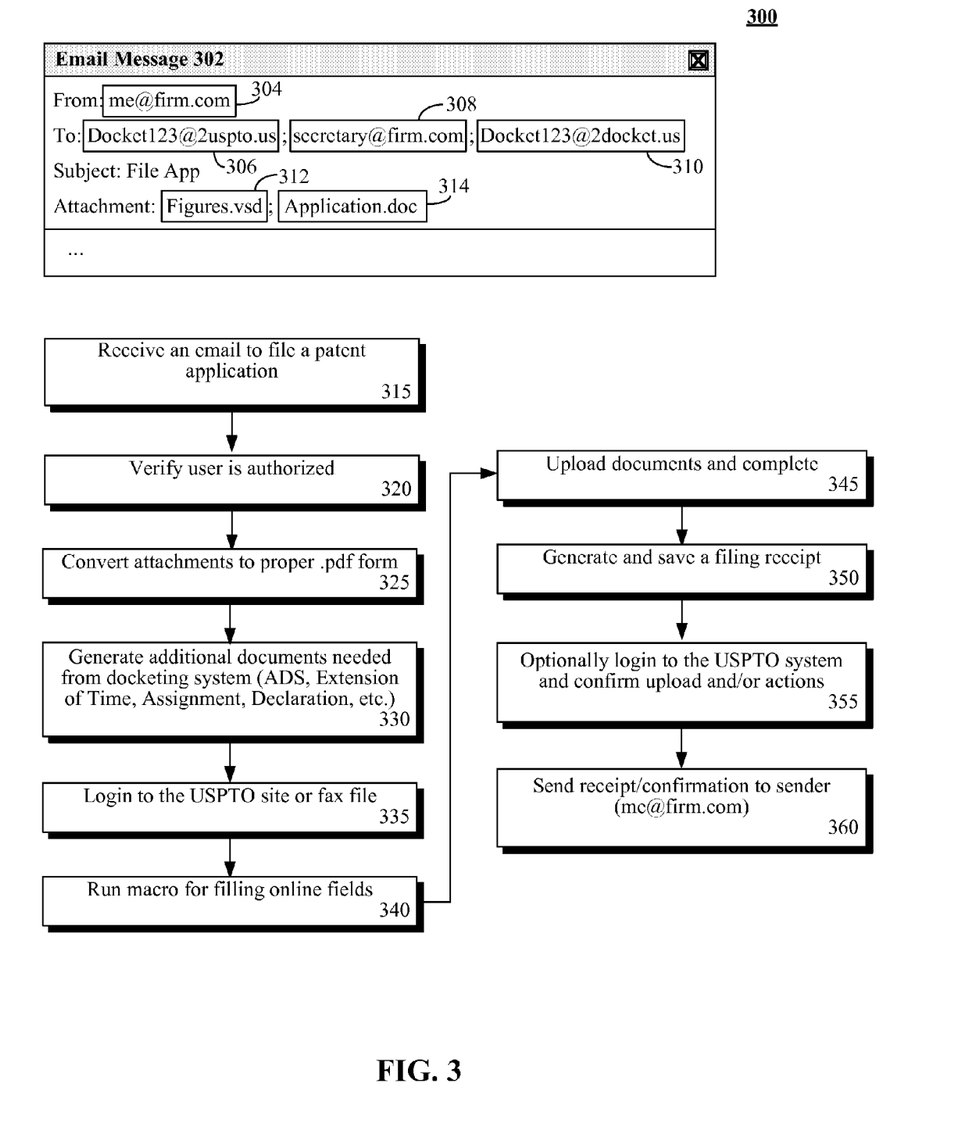
FIG. 3 shows an example of and flowchart for a method for using external data in combination with the email specific data in accordance with embodiments of the inventive arrangements disclosed herein.

FIG. 3 shows an example of and flowchart for a method for using external data in combination with the email specific data in accordance with embodiments of the inventive arrangements disclosed herein. Embodiment 300 illustrates auto filling of an online form responsive to receiving an email message. For a specific example, Applicants detail interacting with the electronic filing system of the USPTO, but it should be noted that the disclosure is not to be limited in this regard and any fillable form (or system) can be substituted.

Diagram 302 shows a sample email message from a user (me@firm.com 304) that triggers automated (or semi-automated) actions for filing a patent with the USPTO in one contemplated embodiment. The "to" section of the email shows multiple recipients, which can include a secretary 308 who receives a standard email message in his/her inbox for the message 302. Another recipient 306 (docket123@2uspto.us) can be to an email address 110 that triggers the final email server 140 (associated with 2uspto.us) to file the case (e.g., automatically fill out an online form with the USPTO for filing the case application). The address 310 (Docket123@2docket.us) can be the address 110 that triggers the final email server 140 (associated with 2docket.us) to docket the case within the firm's docket management system. The attachments 312 and 314 comprise content of the application being filed.

It should be appreciated that it can be highly efficient to use a single email message 302 to produce the effects of: (1) file a case with the USPTO, (2) inform a secretary of the filing, and (3) updating an internal docketing system used by a firm. This is one advantage of this disclosure that is significant over all known alternative approaches. The disclosure provided solution provides an intuitive, user-centric way to perform multiple actions (which would normally consume significant user/administrative assistant time) from a single interface.

The flowchart of FIG. 3 illustrates a method for taking automated or semi-automated actions associated with filing an application with the USPTO. In step 320, the user can be verified as having authority to perform the filing with the USPTO. In step 325, the attachments (312, 314) can be converted into a proper .pdf formatting for USPTO filing. This can require the application to be separated into multiple different documents (e.g., claims, abstract, specification), which can be performed by a parsing action. This action can recognize patterns in the document (e.g., the different section titles) and use these when separating the document.

Additional documents can be automatically generated for the filing of the application in step 330 using information contained in the firm's docketing system. A number of existing systems (e.g., Foundation IP™ by CPA™) include an ability to generate USPTO documents from internal records given the docket number/application number or internal ID number. This type of technique can be used herein. Further, documents that require a signature (such as a declaration or assignment) of the inventors can be recorded in the docket management system as being related to the docket number/ application number. Thus, all of the needed documents (application data sheet, extension of time forms, assignment, declaration, and the like) can be generated and/or retrieved in step 330.

In step 335, the method can log into PRIVATE PAIR of the USPTO web site using the credentials of the sender (if the sender is an attorney, the attorney certificate for USPTO filing can be used). Alternatively, a file-by-fax option can be used, where the appropriate documents are submitted by fax.

In step 340, a macro can be run for filling in the fields of the USPTO web site. Values for these fields can be extracted from the docketing system. Additionally, fees can be paid electronically from a USPTO deposit account (log in credential stored in the docket management system or other data store) or from a credit card. The documents generated in step 330 can be recorded in their appropriate fields of the Web site. In step 345, the documents can be uploaded and the process of filling the online filing via the USPTO web site can be completed.

In step 350, a filing receipt can be generated and saved. In step 355, the macro can optionally log onto the USPTO system to confirm the upload/actions. Step 355 may occur after a time delay to give the USPTO time to update their records. In step 360, a receipt for the filing and/or confirmation can be sent to the sender 304 (me@firm.com) and/or placed in the docketing system.

In one contemplated embodiment, electronic filing via email (or other online payment, purchase, form filling) can be performed as a for-fee service. For example, in one embodiment the filing of the application with the USPTO via email can cost an end-user $70.00, where this money is used to fund/support the system described herein.

It should be appreciated that the above system can function in reverse. For example, the USPTO often sends email reminders of updates to an application to a designated email address. Responsive to receiving this email, a docket management system can extract content from the email (or by logging onto the USPTO web site) and can auto-populate suitable docket fields. This can occur without manual user interactions in one contemplated embodiment. Suitable users (e.g., admin/attorney in charge) can receive reminders of actions needed via the docket management system (since the actions have been properly stored in the docketing system, which supports reminders).

Fractional Email Addresses

Figure 4:
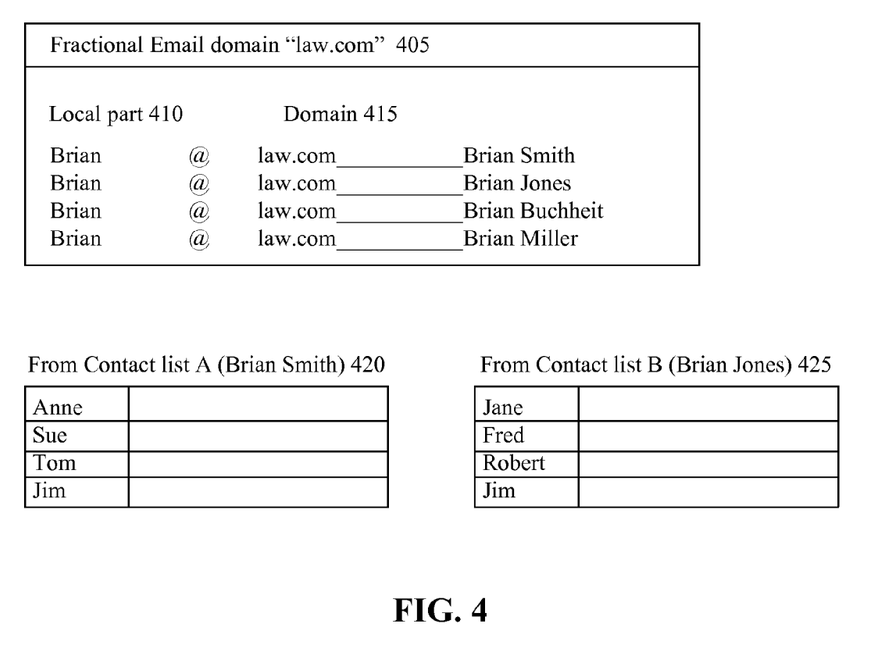
FIG. 4 is a schematic diagram illustrating a system for utilizing fractional email addresses in accordance with embodiments of the inventive arrangements disclosed herein.

FIG. 4 is a schematic diagram illustrating a system for utilizing fractional email addresses in accordance with embodiments of the inventive arrangements disclosed herein. This embodiment of the present invention permits "fractional email addresses". This is similar to "fractional 1-800" numbers in that an email address can be "partially" purchased. To illustrate, a person can purchase a domain 114 to be used as the domain 114 for an email address. Other people can also purchase and use the same "local part" 112 of the email address. Thus, the final server 140 (server associated with the MX records 130) will have to resolve a conflict.

The rules 143 can determine who receives a given email message. For example, the domain 405 "law.com" can be fractionally sold to a large set of firms. Each firm paying a fee for the use, so that they receive email at that domain and/or can send email out using that domain name. Unlike conventional implementations, multiple different people can have the same local part 410. For example, four different people (Brian Smith, Brian Jones, Brian Buchheit, and Brian Miller) can have the email address "brian@law.com".

This is not a problem for properly routing (via router 142) email messages as the final server 140 (associated with law-.com domain) utilizes a set of resolution rules 143. For example, in one embodiment, each user (Brian Smith, Brian Jones, Brian Buchheit, Brian Miller) can have a user specific contact list. Contact list 420, contact list 425, etc. Each contact list can include a set of email addresses. Whenever a sender of the email is in one contact list (and only one), then the email can be conveyed to that person.

In one embodiment, in the event of a conflict, a message can be sent back to the email sender asking which Brian (of a set of conflicted ones) that email message is to be delivered to. Once this is performed once, the information is saved and messages from that person will be properly routed in the future. In one embodiment, the user can be prompted for this information as part of a "spam filter" program, so that the responding user need not know the recipient is a "sharer" of the fractional email message.

Use of the contact list is only one contemplated way for resolving ambiguities. In another, geographic positions (or the sender/recipient) can be used. Thus, a person can purchase a fractional email domain by geographic region. Hence, all email sent to law.com in FLORIDA can be purchased by law firm A, and all email in OHIO to law firm B. Web site and web addresses can be separated in this same manner by region, in one contemplated embodiment. Thus, "fractional web pages" where a domain is purchased partially for a given geographic region only is contemplated herein.

In one embodiment, the email system can be used for direct marketing. For example an email sent to contact@law.com can be directed to whatever set of firms are most willing to pay for the contact. Price can be distinguished by region, content (type of law, for example), strength of lead, etc. Thus, an entirely new marketing mechanism for acquiring revenue is contemplated in one embodiment of the invention.

Routing of Email with Improper Destination Address

Figure 5:
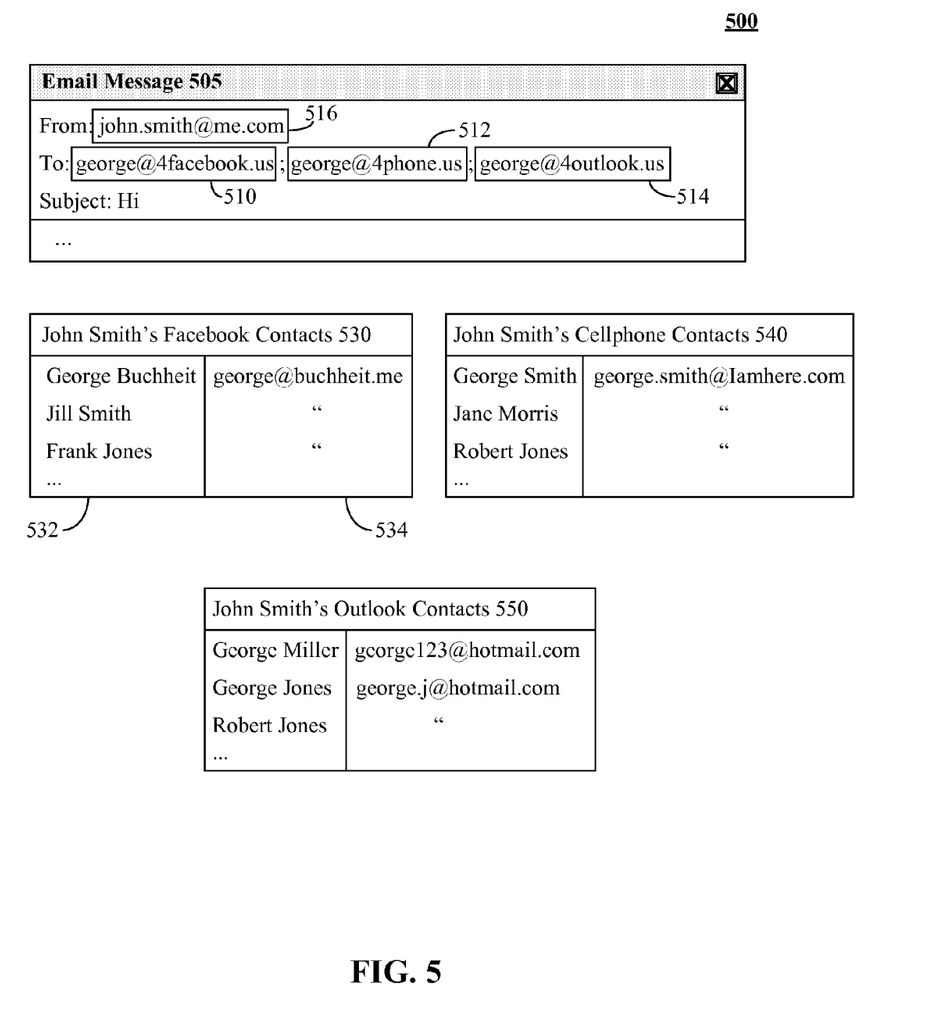
FIG. 5 is a schematic diagram illustrating routing of email messages with one or more improper destination address in accordance with embodiments of the inventive arrangements disclosed herein.

FIG. 5 is a schematic diagram illustrating routing of email messages with one or more improper destination address in accordance with embodiments of the inventive arrangements disclosed herein. In this embodiment, an email can be sent to a person even when the sender does not specify the proper email address. That is, often a person maintains a set of contacts in different places. These include their phone, their home computer, their work computer, their FACEBOOK account, their LINKEDIN account, and the like. It can be very difficult to remember all of the proper email addresses of their contacts, especially when extremely fictitious names are used (e.g., joe1234556@hotmail.com), which are required by popular email services that restrict a user to a unique email address.

The present solution (FIG. 5) in a sense permits the use of a shorthand manner for referencing contacts. This version of the solution is implemented in a server side manner, fully compliant with email standards. That is, a number of easy to remember domain names (e.g., 4facebook.us, 4outlook.us, 4phone.us) can be used. Each of these domains has an MX record 130 within a DNS 126, which points to a server 140, which can determine a proper address. Then the email message 505 is re-routed (forwarded) to that address.

Using the example of FIG. 5, a person named "George" from a sender's FACEBOOK is referenced. This email is received by server 140, which is able to log into the sender's FACEBOOK account (or which has a previously stored list and/or access to contacts from the FACEBOOK account). Table 530 represents a table that equates FACEBOOK contacts (column 532) with email addresses (column 534). Thus, the email "george@4facebook.us" is translated to "george@buchheit.me" by table 530. The server 140 associated with the respective domain (in this instance, 4facebook.us) can forward the message 505 to "george@buchheit.me".

A different server can maintain a lookup list for contacts in John Smith's cell phone 540 (which is associated with @4phone.us domain (114)). This list can include one George "George Smith" having an email of "george.smith@Iamhere.com", which is sent the message 505.

Another can be liked to John Smith's outlook account 550. This can include two Georges (George Miller—george123@hotmail.com; and George Jones—george.j@hotmail.com). Different actions can be taken in a conflicting situation, which are configurable. In one embodiment, rules (143) can be used to try to resolve the proper George. In another configuration, the email message can be sent to both Georges. Or in yet another embodiment, John Smith can be prompted to resolve the ambiguity, and subsequently the message can be sent to the person specified by John Smith.

It should be noted that even though John Smith can be prompted, he may never have known the actual email address of either George but rather be prompted just with the two George's full names. In this manner the disclosure provided solution can permit him to send the email to a contact in his outlook address book, which he would otherwise not have had access to.

The above embodiment can be used for any type of contact list. In one embodiment, a user can be provided a Web interface to specify their contacts and email addresses. In another embodiment, email addresses can be limited to specific contact lists (like FACEBOOK, Outlook, etc.), which are able to be periodically updated to match contacts in these sources.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
 receiving an email message by a final email server; and
 responsive to receiving the email message, performing execution of actions, by the final email server, wherein the final email server, comprising hardware and software, handles email messages of a domain specified after a "@" symbol of an email address to which the email message was sent, wherein performing execution of the actions further comprises:

determining a user id within a non-email system, wherein the user id is associated with a user identifier having an email address specified within the email message, wherein the non-email system is a network system providing fillable online forms to users;

logging onto the non-email system using the user identifier and a password associated with the user identifier; and completing at least a portion of one of the fillable online forms, using content of a body of the email message, content of an attachment of the email message, or combinations thereof, wherein the completing of one of the fillable online forms results in a generated document that was not a document included in the email message;

wherein the generated document is stored in a file system on behalf of a user identified by the user identifier, wherein the file system is located remotely from the final email server, and wherein the completing of the fillable online form and the storing of the generated document occurs automatically without manual user interactions with the non-email system and occurs responsive to receiving the email message at the final email server.

2. The method of claim 1, wherein the completing of at least the portion of one of the fillable online forms uses content of the body of the email message.

3. The method of claim 1, wherein the completing of at least the portion of one of the fillable online forms uses content of an attachment of the email message.

4. The method of claim 1, wherein the completing of at least the portion of one of the fillable online forms uses content of a body of the email message and users content of an attachment of the email message.

5. The method of claim 1, wherein the completing of at least the portion of one of the fillable online forms uses content not conveyed within the email message.

6. The method of claim 1, wherein execution of the actions further comprises:

determining a folder of the file system for storing the generated document using content of the email message; and storing one or more attachment of the email message as files into the folder of the file system, wherein the storing of the files in the folder occurs automatically without manual user interactions with the file system and occurs responsive to the final email server receiving the email message.

7. The method of claim 1, wherein the file system is a system independent of an email system of the final email server.

8. The method of claim 1, wherein a computing system comprising hardware and software that is independently operated and controlled from the non-email system that provides the fillable online forms, determines the user id, logs onto the non-email system, and completes at least a portion of the one of the fillable online forms.

9. The method of claim 1, wherein a computing system comprising hardware and software that is operated and controlled by an entity that operates the final email server, determines the user id, logs onto the non-email system, and completes at least a portion of the one of the fillable online forms.

10. The method of claim 1, wherein a computing system comprising hardware and software that is operated and controlled by an entity that operates the non-email system, determines the user id, logs onto the non-email system, and completes at least a portion of the one of the fillable online forms.

11. A method comprising:

receiving a signal from a final email server to trigger a form completion action for a non-email system, wherein the non-email system is a network system providing fillable online forms to users, wherein the form completion action was triggered in response to the final email server receiving an email message, wherein a user id within the non-email system is determined, wherein the user id is associated with a user identifier having an email address specified within the email message, wherein the final email server handles email messages of a domain specified after a "@" symbol of an email address to which the email message was sent;

as part of executing the form completion action, using the user identifier and a password associated with the user identifier to log onto the non-email system; and as part of executing the form completion action, completing at least a portion of one of the fillable online forms, using content of a body of the email message, content of an attachment of the email message, or combinations thereof, wherein the completing of one of the fillable online forms results in a generated document that was not a document included in the email message;

wherein the generated document is stored in a file system on behalf of a user identified by the user identifier, wherein the file system is located remotely from the final email server, and wherein the completing of the fillable online form and the storing of the generated document occurs automatically without manual user interactions with the non-email system and occurs responsive to receiving the email message at the final email server, causing the final email server to convey the signal to trigger the form completion action.

12. The method of claim 11, wherein the completing of at least the portion of one of the fillable online forms uses content of the body of the email message.

13. The method of claim 11, wherein the completing of at least the portion of one of the fillable online forms uses content of an attachment of the email message.

14. The method of claim 11, wherein the completing of at least the portion of one of the fillable online forms uses content of a body of the email message and users content of an attachment of the email message.

15. The method of claim 11, wherein the completing of at least the portion of one of the fillable online forms uses content not conveyed within the email message.

16. The method of claim 11, wherein execution of the action further comprises:

determining a folder of the file system for storing the generated document using content of the email message; and storing one or more attachment of the email message as files into the folder of the file system, wherein the storing of the files in the folder occurs automatically without manual user interactions with the file system and occurs responsive to the final email server receiving the email message.

17. The method of claim 11, wherein the file system is a system independent of an email system of the final email server.

18. The method of claim 11, wherein a computing system comprising hardware and software that is independently operated and controlled from the non-email system that provides the fillable online forms, determines the user id, logs onto the non-email system, and completes at least a portion of the one of the fillable online forms.

19. The method of claim 11, wherein a computing system comprising hardware and software that is operated and controlled by an entity that operates the final email server, determines the user id, logs onto the non-email system, and completes at least a portion of the one of the fillable online forms.

20. The method of claim 11, wherein a computing system comprising hardware and software that is operated and controlled by an entity that operates the non-email system, determines the user id, logs onto the non-email system, and completes at least a portion of the one of the fillable online forms.

* * * * *